Patented Aug. 10, 1937

2,089,522

UNITED STATES PATENT OFFICE 2,089,522

PROCESS OF PRODUCING BUTYL ALCOHOL

John C. Woodruff, Hugh R. Stiles, and David A. Legg, Terre Haute, Ind., assignors to Commercial Solvents Corporation, Terre Haute, Ind., a corporation of Maryland No Drawing. Application June 12, 1933
Serial No. 675,459

16 Claims. (Cl. 195—44)

Our invention relates to the production of butyl alcohol and other valuable products by the fermentation of sugar-containing solutions. More specifically, our invention relates to the production of normal butyl alcohol, acetone, and ethyl alcohol by the fermentation of sugar solutions by means of bacteria designated herein as *Clostridium saccharo-acetobutylicum*.

It has previously been known that sugar solutions could be fermented by means of organisms of the *Clostridium butyricum* group with the production of various products such as acetic and butyric acids, butyl alcohol, etc. (see for example Bergey's Manual of Determinative Bacteriology, Williams & Wilkins Co., Baltimore, 1925, pages 326-7). However, the yields of butyl alcohol have in all cases been so low as to preclude commercial utilization of such fermentations. Therefore, in spite of the fact that crude sugar solutions represent the cheapest source of raw material, up to the present time the production of butyl alcohol has been accomplished only by the fermentation of starch mashes by organisms of the type *Clostridium acetobutylicum* (Weizmann).

The organisms of the *Clostridium butyricum* group have never been shown to be fermenting agents of a commercial character but have been discarded as members of that long list of microorganisms which produce the desired products, but in such small amounts as not to be economically feasible. The bacteria of this group produce acids and neutral end-products of the type produced by butyl organisms such as *Clostridium acetobutylicum* (Weizmann) and have a peaked acidity curve for the fermentation of the same general type as that produced by the Weizmann organism. The butyl organisms of the *Clostridium acetobutylicum* type maintain their optimum hydrogen ion concentration in the mash without the necessity of control by means of neutralizing agents or the like. In fact, it has been shown that the addition of materials tending to change the hydrogen ion concentration has a definite deleterious effect upon certain of these organisms. For example, Grimbert (Ann. de l'Inst. Past. 7, 353), Du Claux (Ann. de l'Inst. Past. 9, 811), and McCoy et al. (Jour. Infect. Dis., 39, 457) have shown that an addition of calcium carbonate to the mash produces a marked decrease in the yield of butyl alcohol. The natural assumption has therefore been that any attempts to reduce the hydrogen ion concentration of fermentations by organisms of the *Clostridium butyricum* group would likewise reduce the yields of neutral end-products.

However, we have discovered that the group of bacteria herein designated as *Clostridium saccharo-acetobutylicum* will produce high yields of butyl alcohol from commercial sugar-containing mashes if there are maintained certain fermentation conditions, especially an accurate control of the hydrogen ion concentration by means of such substances as calcium carbonate. So much confusion exists in the nomenclature and reported cultural characteristics of the prior art organisms of the *Clostridium butyricum* type that it is impossible to state definitely if any of them are included in the group now designated as *Clostridium saccharo-acetobutylicum*. A certain organism, for example, may be described by one investigator as having properties which would bring it within the present classification, whereas another investigator may report an organism of the same name to have properties which would definitely exclude it from this classification. It is to be understood, therefore, that our invention includes within its scope the use of any of the prior art bacteria which have in fact the characteristics hereinafter specified, irrespective of any conflicting characteristics which may have been reported in the literature. It is to be further understood, of course, that our invention relates to the use of these organisms only under the newly devised fermentation conditions to be hereinafter specified, and not to the use of these organisms generally, under any conditions.

The various conditions which we have found to be essential for the production of high yields of solvents from commercial sugar-containing mashes by organisms of this group are, briefly, the presence of a soluble carbohydrate as the source of carbohydrate, the presence of degraded protein (including ammonia) as the source of nitrogen, a fermentation temperature of 24° C. to 40° C., preferably 29-30° C., and the control of the acidity of the mash during the fermentation such that the final hydrogen ion concentration, obtained by the action of the bacteria, falls within the range of pH 5.0 to pH 6.2, preferably 5.5—5.85. Of course, other known fermentation conditions which are usually employed with any organism of this general type, such as the presence of necessary mineral elements (e. g., phosphates and the like), may be employed in the usual manner known to those skilled in the art but will not often be necessary with such materials as cane molasses.

An essential element of the fermentation of our invention is the control of the hydrogen ion concentration, so that the final pH secured by the action of the bacteria falls within the specified limits. In practically all other known fermentations in which neutral end-products are secured, the adjustment of the initial hydrogen ion concentration has been considered to be of most importance. If this initial hydrogen ion concentration is adjusted within the operative limits, the fermentation will proceed normally and no attention need be paid to the final hydrogen ion concentration. However, we have found in the present case that although the initial hydrogen ion concentration may vary over a considerable range, the final pH obtained by the action of the bacteria must fall within definite limits if consistent high yields of solvents are to be secured.

We have found that the final pH secured by the action of the bacteria may be controlled by the introduction of certain materials into the mash at the beginning of the fermentation. For example, we have found that if calcium carbonate, barium carbonate, iron carbonate, or other insoluble non-toxic base, is added to the mash in an amount sufficient to neutralize any free acidity, and an amount in excess of this to the extent of about 5-7% on the weight of the sugar, the final pH of the fermentation will be found to be within the operative range. Although the various materials mentioned may be satisfactorily used in our process, calcium carbonate has been found, in most cases, to be especially well suited for this purpose, and is to be preferred from an economic standpoint. However, in choosing the material to be employed the composition of the medium should be considered and a material chosen which will not give rise to an undesirable concentration of a particular metal ion, even though generally considered to be non-toxic in character.

The amount to be added in any particular case will of course depend to some extent on the composition of the mash. For example, a mash containing a substantial amount of phosphates, or other material having a buffering action, will require less calcium carbonate than one which is devoid of such materials. Various samples of calcium carbonate will also differ in respect to the amount which is necessary to use, due to the physical properties of the material and also to its chemical properties, as for example, the presence of substantial amounts of lime. In any particular case, preliminary fermentations will enable one skilled in the art to determine the optimum concentration for the calcium carbonate employed. However, in general it may be said that from 3% to 10% on the weight of the sugar, in excess of that required to neutralize the original acidity, will give very satisfactory results. The calcium carbonate or other insoluble base used should, in general, be sufficiently finely divided so that when resting on the bottom of the fermentation vessel they will present a considerable surface to the fermenting mash. When employing this means of controlling the hydrogen ion concentration, undue agitation should be avoided so as to prevent the possibility of fixing too large a percentage of the acids produced in the early stages of the fermentation, and thus undesirably displacing the equilibrium of the fermentation. It should be definitely understood that the purpose of the addition of the basic materials in this process is not to neutralize all the acids produced in the fermentation, but merely to control the hydrogen ion concentration in such a manner that the final pH secured by the action of the bacteria (and not by the action of neutralizing agents) falls within the specified limits.

It is to be understood that the invention is not to be limited to the particular means employed for securing the desired final hydrogen ion concentration. Any equivalents or modifications which would naturally occur to one skilled in the art may, of course, be employed. For example, an accurate pH control may be maintained by continuous or semi-continuous addition of an alkaline material, such as ammonia, during the active stage of the fermentation and until after the "acidity break". However, the mechanical difficulties or procedures of this nature are well known to those skilled in the art. Even a slight over-neutralization at any time during the fermentation will often result in inhibiting further active fermentation for a period of many hours or even days. Consequently, automatic electrometric titration apparatus is most desirable if such a procedure is employed. In any procedure of this nature, the pH should be controlled to approximate that obtained when the specified amounts of insoluble basic materials are employed.

Furthermore, from the standpoint of simplicity of operation, we prefer to control the acidity of the mash during the fermentation by means of the insoluble materials such as calcium carbonate. We have found that for a wide range of grades of molasses, approximately 5-7% of calcium carbonate, or the like, on the weight of the sugar in the mash, secures adequate control of the acidity such that the final hydrogen ion concentration secured by the action of the bacteria falls within the desired limits. This fact may be seen to obviate the necessity for individual treatment of each sample of molasses unless the ultimate possible yield is desired. In view of the difficulties of such a procedure, we prefer to secure the desired pH control by introducing material of the insoluble type into the mash before fermentation begins. The temperature range which we have found to be essential for the best results in this fermentation is within the limits about 28° C. to 32° C. Growth will occur and sometimes active fermentation will take place over a much wider range, but for consistent high yields of solvents from commercial sugar-containing mashes the temperature should be maintained within the range specified and preferably within the narrower range 29-30° C.

With regard to the necessary nutrients for this fermentation, it may be said that degraded protein nitrogen is essential. As used here and in the appended claims, the term "degraded protein nitrogen" is to be taken as including hydrolytic degradation products such as polypeptides, amino acids, etc., metabolic degradation products such as urea, etc., and the final degradation product, ammonia, and its salts. Although ammonia (or an ammonium compound such as a sulphate, etc.) alone has been found to give satisfactory yields of solvents, it is preferred to use a mixture of ammonia and partially degraded protein materials such as yeast water, steep water, and the like, in order to consistently secure optimum yields. However, very satisfactory results are obtained when using only partially degraded protein material as the nitrogen source. For example, materials such as yeast water, steep water, and the distillery slop from the Clostridium acetobutylicum (Weizmann) fermentation have been found to be satisfactory. Although undegraded protein, such as corn gluten, corn germ meal, and the like cannot be utilized as the sole source of nitrogen, small amounts of such materials, in addition to ammonia or partially degraded protein, sometimes produce improved results. Other nutrient materials such as mineral elements, e. g. phosphates and the like, should be present in small amounts as in the case of other known fermentations. However, if crude sugar solutions such as molasses mashes are employed, these materials will usually be found to be present in sufficient amounts. The amount of ammonia or degraded protein to be added will also vary with the raw material used. For example, certain samples of molasses may be found to have sufficient ammonium compounds and other degraded protein so that very little more need be added. In general, it may be said that with cane molasses mashes from 0.7 to 1.7% of $NH_3$ as ammonium sulphate on the weight of the sugar or an equivalent amount of other degraded protein, will give satisfactory results.

The following is a typical medium which we have found to be suitable for laboratory fermentations:

Molasses medium (Medium I)

Louisiana molasses is diluted to a sugar concentration of about 5.5% and to this is added about 0.3% $(NH_4)_2SO_4$ and about 0.4% of 200 mesh calcite, based on the mash volume. This mash is sterilized for 30 minutes at 20 lbs. pressure.

Of course, it is well known to those skilled in the art that different samples of molasses vary in a number of respects, such as sugar content, ash content, and the like. These variations naturally change somewhat the mashing procedure in different cases. For example, some samples of molasses may be found to be lacking in sufficient mineral elements such as phosphates and the like. Other samples may be found to be lacking in partially degraded nitrogenous material. Also, there are certain unknown factors present in some types of molasses which make it desirable to use lower concentrations than in the case of other more suitable types. In any particular case, one skilled in the art may determine the special requirements, if any, by preliminary fermentations and may then make such changes as are necessary in the mashing procedure. However, such changes in mashing procedure for various types of molasses will be necessary only to secure the absolute maximum yield. Very satisfactory yields can be secured in practically all cases by means of the procedure outlined above.

The bacteria which have been designated *Clostridium saccharo-acetobutylicum* in our invention and which are so designated in the appended claims, comprise any bacteria having the following primary characteristics:

I. Morphological
   A. Rod-shaped
   B. Spore-forming—Clostridia and Plectridia
   C. Practically indistinguishable from members of the *Clostridium butyricum* group
II. Biochemical
   A. Carbohydrate fermentation
     1. Ability to produce fair yields of butyl alcohol and acetone consistently from starch as the only source of carbohydrate (i. e., corn or other mash containing starch and suitable nutrients).
     2. Ability to produce yields of butyl alcohol and acetone consistently above 30% on the weight of the sugar from 5% sucrose media or the uninverted molasses medium (Medium I) described above.
     3. Ability to produce yields of butyl alcohol and acetone consistently above 30% on the weight of the sugar from 5% glucose media with suitable nutrients, or an inverted molasses medium corresponding to Medium I.

II. Biochemical—Continued
   B. Nitrogen metabolism
     1. Ability to produce high yields of butyl alcohol and acetone in sugar media containing ammonia as the principal source of nitrogen.
     2. Ability to utilize degraded protein (including ammonia) as the sole nitrogen source.
     3. Inability to utilize undegraded protein as sole source of nitrogen.
     4. Inability to liquefy gelatin or to produce more than slight proteolysis of milk.
   C. Oxygen requirements
     1. Anaerobic.
   D. Temperature range for solvent production
     1. From 24° C. to 40° C., preferably 29° C. to 30° C.
   E. Hydrogen ion concentration for solvent production
     1. Final pH of 5.0–6.2, preferably 5.4–5.85.

In view of the uncertainty in the literature as to methods utilized for certain of the biochemical tests referred to above, we believe it to be desirable to amplify, somewhat, the characteristics briefly outlined. For example, the fermentation characteristics referred to under the heading "Carbohydrate fermentation" are those characteristics determined under optimum conditions, as for example, in the molasses medium described above or in similar media containing other carbohydrates. It should be particularly noted that these and all other fermentation characteristics described in this specification relate to the fermentation of a commercial mash, i. e., one which has a sugar concentration of the order of 5%. Quite different results are often obtained with laboratory media containing lower percentages of sugar. It should also be noted that fermentation characteristics such as these refer to normal consistent results and not to abnormally low or high results which may sometimes be obtained with any culture. A typical carbohydrate fermentation test of an organism falling in this group is given below as an illustration.

| Medium No. | Composition percent by weight of mash | Solvent yield (percent of carbohydrate) |
|---|---|---|
| II | 7% corn<br>0.17% $(NH_4)_2SO_4$<br>0.2% $CaCO_3$<br>0.1% $Ca(NH_4)_4(PO_4)_2$ | 25.7 |
| III | 5.0% sucrose<br>0.5% $(NH_4)_2SO_4$<br>0.06% $KH_2PO_4$<br>0.06% $K_2HPO_4$<br>0.1% $MgSO_4$<br>0.4% $CaCO_3$ | 32.6 |
| IV | 5% glucose in 10% yeast water<br>0.5% $CaCO_3$ | 36.2 |
| V* | 5.44% sugar as inverted molasses<br>0.07% $NH_3$<br>0.4% (200 mesh calcite) $CaCO_3$ | 35.8 |
| VI | 5.45% sugar as uninverted molasses<br>0.25% $(NH_4)_2SO_4$<br>0.4% $CaCO_3$ (200 mesh calcite) | 36.6 |

* Louisiana molasses at about 20% sugar concentration inverted by heating with sulphuric acid of about 3.6% concentration on the weight of the sugar for 40 minutes at 20 lbs. pressure, free ammonia added to neutralize acid, calcium carbonate then added and medium sterilized 30 minutes at 20 lbs. pressure.

With regard to the nitrogen metabolism, the undegraded protein materials referred to are such materials as corn gluten and corn germ meal; the degraded protein referred to comprises such materials as yeast water, steep water, distillery slop, and urea; and the gelatin liquefaction refers to incubation on nutrient gelatin containing 2% glucose. For example, stab cultures on such medium were incubated at 22° C. and shake cultures were incubated at 30° C. Excellent growth was obtained in each case but at the end of 30 days the gelatin was in all cases found to be solid at 22° C. The proteolysis of milk refers to tests such as the standard litmus milk test. In litmus milk, organisms of this group first reduce the litmus and then give a somewhat rennet-like acid curd which shows only slight digestion at the end of 30 days. The following example will illustrate a test of the type which may be employed to determine the nitrogen metabolism of the organisms:

| Medium No. | Composition | Solvent yield (percent on sugar) |
|---|---|---|
| VII | 5% sucrose<br>0.13% $K_2HPO_4$<br>0.05% NaCl<br>0.01% $MgSO_4$<br>0.25% peptone<br>0.25% corn germ meal<br>0.5% $CaCO_3$ | 6.0 |
| VIII | 5% sucrose<br>0.4% $(NH_4)_2SO_4$<br>0.07% $KH_2PO_4$<br>0.07% $K_2HPO_4$<br>0.1% $MgSO_4$<br>0.5% $CaCO_3$ | 26.4 |
| IX | 5% sucrose<br>0.2% $(NH_4)_2SO_4$<br>0.2% corn gluten<br>0.2% corn germ meal<br>0.07% $KH_2PO_4$<br>0.07% $K_2HPO_4$<br>0.01% $MgSO_4$<br>0.5% $CaCO_3$ | 30.6 |
| X* | 5% sucrose in distillery slop<br>0.4% $CaCO_3$ | 31.9 |
| XI* | 5% sucrose in distillery slop<br>0.3% $(NH_4)_2SO_4$<br>0.4% $CaCO_3$ | 38.0 |

*Slop from fermentation of 7.5% corn mash by *Clostridium acetobutylicum* (Weizmann), adjusted to pH 6.1.

It is to be noted that the statements in the outline regarding the nitrogen requirements of these organisms refer to the suitability of nitrogenous nutrients for the production of consistent high yields of solvents and not to the ability or inability to utilize such forms of nitrogen for growth or slight fermentation. For example, undegraded protein such as a mixture of corn gluten and corn germ will give a slight fermentation, e. g., a solvent yield of one or two percent and molasses media will give a fair yield, i. e., up to 20% or so, in some cases, without the addition of ammonia or other degraded protein nutrient.

It is further to be noted that the utilization of ammonia is specified as the principal source of nitrogen, rather than the sole source, for optimum solvent production. These organisms can utilize ammonia as the sole source of nitrogen, in some cases with optimum solvent yield, but for consistent high yields of solvents it is preferred to have a small amount of some other degraded protein material present in addition to the ammonia. This additional amount, however, is generally present in such materials as molasses so that in this case the use of ammonia alone will serve to produce optimum yields.

The term "anaerobic" as used in the above outline, refers to the inability of the organisms to grow on the surface of nutrient glucose agar when incubated aerobically. The organisms are, however, capable of developing and producing satisfactory fermentation in deep liquid media when incubated aerobically, due to the anaerobic conditions maintained within the medium.

The temperature and hydrogen ion concentration ranges referred to do not represent the entire ranges within which growth will occur but represent merely the ranges within which high yields of solvents may be obtained when operating under the other conditions specified. Also, the solvent ratios which are given as characteristic of the organism are those which are normally consistently obtained under optimum conditions and do not refer to abnormal ratios which may sometimes be secured with any of the cultures. Furthermore, it is to be understood that the characteristics specified for these organisms are not to be taken as limited to the specific methods and data given above. These were given merely by way of illustration, whereas the characteristics of the organisms as claimed in our invention are those given generally in the outline.

The organisms of this group are widely distributed in nature and may be isolated from such various sources as soil, rotted wood, grain, corn stalks, river mud, and the like. In view of the characteristics listed above, one skilled in the art may readily isolate these organisms from such sources by known methods of isolation. Of course, as is apparent to one skilled in the art, these organisms cannot be isolated from every sample of material tested. However, if a number of different materials are tried, a good culture will nearly always be secured. The following specific example is given as illustrative of one of the methods applicable to this purpose:

A number (say at least twenty) of 125 c. c. capacity, conical flasks each containing 100 c. c. of medium of the following composition are prepared:

| | Per cent |
|---|---|
| Cane molasses (4–5% sugar) | 8–10 |
| $(NH_4)_2SO_4$ | 0.25 |
| $CaCO_3$ (200 mesh calcite) | 0.4 |

These flasks of media are sterilized in the usual manner for 30 minutes at 20 lbs. pressure and while still hot, e. g., 80–90° C., are each inoculated with about 1 gram of soil, mud, corn, corn stalks, rotted wood, and the like, preferably from a field in which some kind of carbohydrate crop has been grown. The flasks are held at the inoculating temperature for a short time, e. g., 1 to 2 minutes and then rapidly cooled to 30–32° C. and inoculated at this temperature for five days. From the flasks showing most active fermentation are next inoculated a number of 10" x ¾" test tubes each containing 15 c. c. of 20% sterile potato mash, using about 3 c. c. of inoculant. The inoculated tubes are heated in a steamer for about 1½ minutes at a temperature of 95–100° C. and then quickly cooled to 30–32° C. and incubated at this temperature for 4–5 days. From these tubes are next selected for further investigation those which showed most active fermentation, as judged by the heading up of the mash. Transfers from these tubes are next made to dilution plates containing a solid medium composed of:

| | Per cent |
|---|---|
| Standard nutrient agar | 1.7 |
| $(NH_4)_2SO_4$ | 0.1 |
| Sucrose as glucose | 2.0 |

The plates are incubated under strictly anaerobic conditions, preferably in an atmosphere of carbon dioxide. After 72 hours incubation colonies are selected which are slightly raised, opalescent to opaque, cream colored and having substantially round entire edges. These colonies are used as inoculant for tubes of 20% potato mash which are incubated for 5 days at 30–32° C. The resultant spore tubes may then be used to inoculate suitable molasses mashes, as herein described, heat shocking the bacteria at the first transfer and then retransferring at 24 hour intervals on the same molasses medium. After a number of such transfers, say 5 to 7, quantitative fermentations may be carried out. The cultures which show yields of 29–36% of total solvents on the weight of the sugar of uninverted molasses mash of 5–5.5% sugar concentration, and a solvent ratio of more than 64% normal butyl alcohol (usually 68–73%), more than 18% acetone (usually 25–32%) and about 1–3% ethyl alcohol with no indication of isopropyl alcohol in more than traces will probably be the desired cultures and may be further tested to see whether they conform with the criteria herein set forth.

It is to be understood, of course, that the above isolation procedures are illustrative only and may be varied in any manner known to those skilled in the art. Furthermore, it is to be understood that the present invention is not limited to the use of cultures isolated by this or any other method; but, as has been previously stated, it includes within its scope any previously obtained bacteria, from any source, which have the characteristics above outlined.

Although the present invention includes within its scope all bacteria which have in common the characteristics outlined above, irrespective of any differences in minor characteristics not included in this outline, it is preferred to use a particular member of this group of organisms which has been designated *Clostridium saccharo-acetobutylicum α*. This organism is described below according to the Descriptive Chart of the Society of American Bacteriologists.

Name of organism: *Clostridium saccharo-acetobutylicum α*

Source: Soil

I. Morphology
  1. Vegetative cells
    Medium used: Medium I (described above); 24 hours at 30° C.
    Form: Short and long rods
    Arrangement: Single and chains
    Limits of length: 2.5–7.0$\mu$; of diameter 1.0–1.3$\mu$
    Size of majority: 4.0 x 1.0$\mu$
    Ends: Rounded
  2. Sporangia: Present
    Medium used: Medium I containing 4% sugar; 48 hours at 30° C.
    Form: Spindled, clavate
    Limits of length: 2.5–11.0$\mu$; of diameter 1.6–2.3$\mu$
    Size of majority: 6.0 x 2.2$\mu$
  3. Endospores: Present
    Medium used: 20% potato mash; 14 days at 30° C.
    Stain used: Nigrosin
    Location of endospores: Central to terminal
    Form: Ellipsoidal to cylindrical
    Limits of length: 3.0–5.0$\mu$; of diameter 1.8–2.2$\mu$
    Size of majority: 4.0 x 2.0$\mu$
  4. Motility
    In broth: ++
    On agar: ++

I. *Morphology*—Continued
  5. Flagella: Present
    Attachment: Peritrichiate
    Stain used: Cesares Gil
  6. Irregular forms: Many
  7. Staining reactions
    Gram stain:
      1 day: Positive
      2 days: Positive, some negative
      3 days: Negative, some positive
      4 days: Negative
  8. Iodine stain: Granulose shows in Clostridia at 48 hours II. Cultural characteristics
  1. Agar stroke
    Medium used: 2% glucose agar containing 0.1% $(NH_4)_2SO_4$
    Incubation temperature: 30° C.
    Age: 3 days
    Growth: Moderate (incubated anaerobically)
    Form: Beaded
    Elevation: Raised to convex
    Luster: Glistening
    Surface: Smooth to contoured
    Optical character: Opaque
    Chromogenesis: None to light cream or light yellow
    Odor: Butyrous or butylic
    Consistency: Viscid
    Medium: Unchanged
  2. Nutrient broth +1% glucose
    Incubation temperature: 30° C.
    Age: 2 days
    Surface growth: None
    Clouding: Yes
    Odor: Slightly butyrous
    Sediment: Very slight in 2 days, decided in 7 days
  3. Gelatin stab
    Medium used: 2% glucose gelatin
    Incubation temperature: 22° C.
    Age: 30 days
    Growth: Slight, better at bottom
    Line of puncture: Beaded
    Liquefaction: None
    Degree of liquefaction in 30 days: None
    Medium: Unchanged
  4. Agar colonies
    Medium used: 2% glucose agar containing 0.1% $(NH_4)_2SO_4$
    Incubation temperature: 30° C.
    Age: 3 days
    Growth: Slow
    Form: Circular
    Surface: Smooth
    Elevation: Raised to convex
    Edge: Entire
    Internal structure: Finely-granular III. Physiology
  1. Temperature relations
    Fermentation temperature range: 24–40° C.
  2. Relation to reaction of medium
    Fermentation pH range: 4.0–7.0
  3. Chromogenesis
    Nutrient gelatin: None to slight cream
    Nutrient agar: None to slight cream
    Potato: Cream
  4. Production of Indole
    Medium: Broth in 1% glucose
    Test used: Paradimethylaminobenzaldehyde
    Presence: Absent
  5. Production of hydrogen sulfide
    Medium: Glucose lead acetate agar
    Presence: Absent III. *Physiology*—Continued
  6. Relation to oxygen
    Medium: 2% glucose agar containing 0.1% ammonium sulphate
    Aerobic growth: None
    Anaerobic growth: Moderate
    Medium: Medium I (described above) deep tubes
    Aerobic growth: Abundant
    Anaerobic growth: Abundant
  7. Litmus milk
    Reaction: Acid in 1–2 days
    Acid curd: Slowly formed, 7–14 days
    Peptonization: Slight in 30 days
    Reduction of litmus:
      Beginning: 1–2 days
      End: Uncertain due to oxidation of litmus by atmosphere above medium
  8. Nitrate reduction
    Medium: Nitrate-peptone broth
    Nitrite: α-naphthylamine-sulfanilic acid
    Gas: Absent
  9. Carbohydrate fermentation
    Medium used: 1.0% carbohydrate
      0.5% peptone
      0.05% $KH_2PO_4$
      0.05% $K_2HPO_4$
      0.03% $(NH_4)_2SO_4$
      0.02% $MgSO_4$
      .001% NaCl
      .001% $MnSO_4$
      .001% $FeSO_4$
      pH adjusted to 6.3
    Incubation temperature: 30° C.
    Time: 72 hours

| Carbohydrate | Acid* | Gas* |
|---|---|---|
| Corn starch | +++ | +++ |
| Soluble starch | +++ | +++ |
| Dextrin | +++ | +++ |
| Raffinose | + | + |
| Sucrose | +++ | +++ |
| Lactose | ++ | ++ |
| Maltose | +++ | +++ |
| Glucose | +++ | +++ |
| Levulose | +++ | +++ |
| Xylose | +++ | +++ |
| Mannitol | + | + |
| Glycerol | − | − |
| Dulcitol | − | − |

\* − negative; + very slight; ++ moderate; +++ decided; ++++ abundant.

It is known to those skilled in the art that many of the characteristics included in the above Descriptive Chart are variable and that different results may be obtained by only slight changes in the media, age of culture, or fermentation conditions. This chart, therefore, is included herein as an aid in identification of the bacteria and not as an absolute limitation. It is believed that with the aid of the general outline previously given and the above Descriptive Chart, one skilled in the art can readily identify *Clostridium saccharo-acetobutylicum* α with certainty in spite of slight variations in the minor characteristics of the chart. In any event, a check can be obtained by testing the culture at different intervals and under slightly different fermentation conditions noting the characteristics which appear most consistently.

When carrying out large scale fermentations with the organism just described or with any of the group *Clostridium saccharo-acetobutylicum*, it is desirable to take certain precautions with regard to the inoculant in order to insure consistent high yields. The amount of inoculant used should be from 2 to 6% by volume, preferably about 4%. Also, the inoculant should be at least the second generation removed from the spore state and preferably the fifth to seventh generation. Of course, in large scale operations this latter may readily be accomplished by the successive transfers required to build up the necessary volume of inoculant. The following procedure has been found to be eminently satisfactory for securing an active inoculant. A culture is allowed to sporulate for at least five days on 20% potato mash and is then transferred to a flask of hot, e. g., 90–100° C., 4% malt extract medium containing 0.5% $CaCO_3$. This medium is then rapidly cooled to 31–32° C. and incubated for 24 hours at that temperature. The culture is then transferred to a flask containing Type I Medium of 4% sugar concentration, incubated for 24 hours at 31–32° C. and then transferred to Type I Medium of 5% sugar concentration. Transfers are then continued in this last medium until the desired generation is secured.

The products obtained in the fermentation of commercial sugar media containing about 5% sugar, e. g., a 10% cane molasses mash, are normal butyl alcohol, acetone and ethyl alcohol, the yields usually ranging from 28–36% of total solvents on the weight of the sugar. The following solvent ratios are obtained:

Butyl alcohol _____ above 64%; usually 68–73%
Acetone _____ above 18%; usually 26–32%
Ethyl alcohol _____ below 6%; usually 1– 3%

The gases given off during the fermentation consist of carbon dioxide and hydrogen in the ratio of $CO_2/H_2$ of the order of magnitude of 2 to 1.

The following specific examples will serve to illustrate the process of the present invention:

*Example I*

Medium I containing 5.5% sugar was inoculated with 4% of a sixth generation culture of *Clostridium saccharo-acetobutylicum* α and incubated at 30° C. for 68 hours. The yield and solvent ratio were found to be as follows:

| Yield percent on sugar | Solvent ratio | | |
|---|---|---|---|
| | Butyl alcohol | Acetone | Ethyl alcohol |
| 36.0 | 69.6 | 27.5 | 2.9 |

*Example II*

Medium I containing 5.5% sugar was inoculated with 4% of a sixth generation culture of bacteria isolated from soil and incubated at 30° C. for 68 hours. The yield and solvent ratio were found to be as follows:

| Yield percent on sugar | Solvent ratio | | |
|---|---|---|---|
| | Butyl alcohol | Acetone | Ethyl alcohol |
| 34 | 72.0 | 25.7 | 2.3 |

*Example III*

Medium I containing 5.5% sugar was inoculated with 5% of a sixth generation culture of bacteria isolated from soil (a different strain from that of Example II) and incubated at 30° C. for 68 hours. The yield and solvent ratio were found to be as follows:

| Yield percent on sugar | Solvent ratio | | |
|---|---|---|---|
| | Butyl alcohol | Acetone | Ethyl alcohol |
| 31.7 | 71.8 | 23.8 | 4.4 |

*Example IV*

Fermentations were carried out as in Example I with the exception that in addition to the determination of solvent yield and solvent ratio, the fermentation gases were collected and analyzed. The following results were secured:

| Solvent yield percent on sugar | Solvent ratio | | | Gas yield percent of sugar | Gas ratio percent by volume | |
|---|---|---|---|---|---|---|
| | Butyl Alcohol | Acetone | Ethyl Alcohol | | $CO_2$ | $H_2$ |
| 34.8 | 73.6 | 25.0 | 1.4 | 54.5 | 66 | 34 |
| 34.6 | 73.6 | 25.0 | 1.4 | 53.0 | 65 | 35 |

*Example V*

Medium VI containing 5.3% sugar was inoculated with 4% of a sixth generation culture of the soil bacteria utilized in Example II and incubated at 30° C. for 68 hours. The yield and solvent ratio were found to be as follows:

| Yield percent on sugar | Solvent ratio | | |
|---|---|---|---|
| | Butyl alcohol | Acetone | Ethyl alcohol |
| 34.8 | 73.4 | 24.2 | 2.4 |

*Example VI*

A medium containing 7% hydrol (4.8% total carbohydrate, 90% distillery slop (from fermentation of 7.5% corn mash by *Clostridium acetobutylicum* (Weizmann) neutralized with soda to pH 6.0), 0.2% $(NH_4)_2SO_4$ and 0.4% $CaCO_3$ was inoculated with 4% of a third generation culture of *Clostridium saccharo-acetobutylicum* α and incubated at 30° C. for 68 hours. The yield and solvent ratio were found to be as follows:

| Yield, percent on carbohydrate | Solvent ratio | | |
|---|---|---|---|
| | Butyl alcohol | Acetone | Ethyl alcohol |
| 33.9 | 65.7 | 29.9 | 4.4 |

It is to be understood, of course, that the examples given above by way of illustration are not to be taken as limiting our invention to the specific materials or methods employed. For example, other sources of soluble carbohydrate may be utilized, as for example wood sugar, beet molasses, whey, and the like. However, it is preferred to use molasses as the source of carbohydrate since this material is available in the largest quantities, is low priced, and is fairly standard in composition. If raw materials other than molasses are utilized, one skilled in the art may readily make such adjustments in the composition of the media as are necessary to approximate the composition illustrated for molasses. Also, various other sources of degraded protein nitrogen, such as amino acids, urea, and the like, may be employed. One skilled in the art may readily determine by preliminary fermentations the optimum concentration of the particular degraded protein material which it is desired to employ. The hydrogen ion control may also be effected by means of materials other than those specifically mentioned. For example, other non-toxic materials which are substantially water-insoluble may be used, or soluble materials may be used if they are added in such a manner as to simulate the effect of the non-soluble materials in the amounts specified.

In general, it may be said that equivalents and modifications of procedure which would naturally occur to one skilled in the art may be employed without departing from the scope of our invention.

The invention now having been described, what we claim is:

1. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as *Clostridium saccharo-acetobutylicum*, the improvement which comprises supplying nitrogenous nutrient to the mash in the form of degraded protein nitrogen, and supplying non-toxic alkaline neutralizing agents to the mash throughout the fermentation to control the acidity thereof whereby the final hydrogen ion concentration secured by the action of the bacteria falls within the range pH 5.0 to pH 6.2.

2. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as *Clostridium saccharo-acetobutylicum*, at temperatures from 24° C. to 40° C., the improvement which comprises supplying nitrogenous nutrient to the mash in the form of degraded protein nitrogen, and supplying non-toxic alkaline neutralizing agents to the mash throughout the fermentation to control the acidity thereof whereby the final hydrogen ion concentration secured by the action of the bacteria falls within the range pH 5.0 to pH 6.2.

3. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as *Clostridium saccharo-acetobutylicum*, at temperatures from 24° C. to 40° C., the improvement which comprises supplying nitrogenous nutrient to the mash in the form of degraded protein nitrogen, and supplying substantially water insoluble non-toxic alkaline neutralizing agents to the mash throughout the fermentation to control the acidity thereof whereby the final hydrogen ion concentration secured by the action of the bacteria falls within the range pH 5.0 to pH 6.2.

4. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as *Clostridium saccharo-acetobutylicum*, at temperatures from 24° C. to 40° C., the improvement which comprises supplying nitrogenous nutrient to the mash in the form of degraded protein nitrogen, and supplying calcium carbonate to the mash throughout the fermentation to control the acidity thereof whereby the final hydrogen ion concentration secured by the action of the bacteria falls within the range pH 5.0 to pH 6.2.

5. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as Clostridium saccharo-acetobutylicum, at temperatures from 24° C. to 40° C., the improvement which comprises supplying nitrogenous nutrient to the mash in the form of degraded protein nitrogen, and supplying non-toxic alkaline neutralizing agents to the mash throughout the fermentation to control the acidity thereof whereby the final hydrogen ion concentration secured by the action of the bacteria falls within the range pH 5.5 to pH 5.85.

6. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as Clostridium saccharo-acetobutylicum, at temperatures from 24° C. to 40° C., the improvement which comprises supplying nitrogenous nutrient to the mash in the form of degraded protein nitrogen, and supplying substantially water insoluble non-toxic alkaline neutralizing agents to the mash throughout the fermentation to control the acidity thereof whereby the final hydrogen ion concentration secured by the action of the bacteria falls within the range pH 5.5 to pH 5.85.

7. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as Clostridium saccharo-acetobutylicum, at temperatures from 24° C. to 40° C., the improvement which comprises supplying nitrogenous nutrient to the mash in the form of degraded protein nitrogen, and supplying calcium carbonate to the mash throughout the fermentation whereby the final hydrogen ion concentration secured by the action of the bacteria falls within the range pH 5.5 to pH 5.85.

8. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as Clostridium saccharo-acetobutylicum, at temperatures from 24° C. to 40° C., the improvement which comprises supplying nitrogenous nutrient to the mash in the form of degraded protein nitrogen, and supplying a neutralizing agent to the mash throughout the fermentation to control the acidity thereof, the said neutralizing agent being introduced into the mash in the form of an initial addition of calcium carbonate in a concentration of 3% to 10% based on the weight of the sugar in the mash in excess of that required to neutralize the initial acidity of the mash.

9. In a process for the production of normal butyl alcohol, acetone, and ethyl alcohol by subjecting a fermentable mash containing soluble carbohydrate, as the principal fermentable carbohydrate, to the action of a culture of bacteria of the group herein described and designated as Clostridium saccharo-acetobutylicum, at temperatures from 24° C. to 40° C., the improvement which comprises supplying nitrogenous nutrient to the mash in the form of degraded protein nitrogen, and supplying a neutralizing agent to the mash throughout the fermentation to control the acidity thereof, the said neutralizing agent being introduced into the mash in the form of an initial addition of calcium carbonate in a concentration of approximately 5% based on the weight of the sugar in the mash in excess of that required to neutralize the initial acidity of the mash.

10. In a process for the production of normal butyl alcohol, acetone, and ethyl alcohol by subjecting a fermentable mash to the action of a culture of bacteria of the group herein described and designated as Clostridium saccharo-acetobutylicum, at temperatures from 24° C. to 40° C., the improvement which comprises supplying the principal fermentable carbohydrate to the mash in the form of molasses, supplying nitrogenous nutrient to the mash in the form of an ammonium compound and supplying non-toxic alkaline neutralizing agents to the mash throughout the fermentation to control the acidity thereof whereby the final hydrogen ion concentration secured by the action of the bacteria falls within the range pH 5.0 to pH 6.2.

11. In a process for the production of normal butyl alcohol, acetone, and ethyl alcohol by subjecting a fermentable mash to the action of a culture of bacteria of the group herein described and designated as Clostridium saccharo-acetobutylicum, at temperatures from 24° C. to 40° C., the improvement which comprises supplying the principal fermentable carbohydrate to the mash in the form of molasses, supplying nitrogenous nutrient to the mash in the form of an ammonium compound and supplying substantially water insoluble non-toxic alkaline neutralizing agents to the mash throughout the fermentation to control the acidity thereof whereby the final hydrogen ion concentration secured by the action of the bacteria falls within the range pH 5.0 to pH 6.2.

12. In a process for the production of normal butyl alcohol, acetone, and ethyl alcohol by subjecting a fermentable mash to the action of a culture of bacteria of the group herein described and designated as Clostridium saccharo-acetobutylicum, at temperatures from 24° C. to 40° C., the improvement which comprises supplying the principal fermentable carbohydrate to the mash in the form of molasses, supplying nitrogenous nutrient to the mash in the form of an ammonium compound and supplying calcium carbonate to the mash throughout the fermentation to control the acidity thereof whereby the final hydrogen ion concentration secured by the action of the bacteria falls within the range pH 5.0 to pH 6.2.

13. In a process for the production of normal butyl alcohol, acetone, and ethyl alcohol by subjecting a fermentable mash to the action of a culture of bacteria of the group herein described and designated as Clostridium saccharo-acetobutylicum, at temperatures from 24° C. to 40° C., the improvement which comprises supplying the principal fermentable carbohydrate to the mash in the form of molasses, supplying nitrogenous nutrient to the mash in the form of an ammonium compound and supplying substantially water insoluble non-toxic alkaline neutralizing agents to the mash throughout the fermentation to control the acidity thereof whereby the final hydrogen ion concentration secured by the action of the bacteria falls within the range pH 5.5 to pH 5.85.

14. In a process for the production of normal butyl alcohol, acetone, and ethyl alcohol by subjecting a fermentable mash to the action of a culture of bacteria of the group herein described and designated as *Clostridium saccharo-acetobutylicum*, at temperatures from 24° C. to 40° C., the improvement which comprises supplying the principal fermentable carbohydrate to the mash in the form of molasses, supplying nitrogenous nutrient to the mash in the form of an ammonium compound and supplying calcium carbonate to the mash throughout the fermentation to control the acidity thereof whereby the final hydrogen ion concentration secured by the action of the bacteria falls within the range pH 5.5 to pH 5.85.

15. In a process for the production of normal butyl alcohol, acetone, and ethyl alcohol by subjecting a fermentable mash to the action of a culture of bacteria of the group herein described and designated as *Clostridium saccharo-acetobutylicum*, at temperatures from 24° C. to 40° C., the improvement which comprises supplying the principal fermentable carbohydrate to the mash in the form of molasses, supplying nitrogenous nutrient to the mash in the form of an ammonium compound and supplying an alkaline neutralizing agent to the mash throughout the fermentation to control the acidity thereof, the said neutralizing agent being introduced in the form of an initial addition of calcium carbonate in a concentration of 3% to 10% based on the weight of the sugar in the mash in excess of that required to neutralize the initial acidity of the mash.

16. In a process for the production of normal butyl alcohol, acetone, and ethyl alcohol by subjecting a fermentable mash to the action of a culture of bacteria of the group herein described and designated as *Clostridium saccharo-acetobutylicum*, at temperatures from 24° C. to 40° C., the improvement which comprises supplying the principal fermentable carbohydrate to the mash in the form of molasses, supplying nitrogenous nutrient to the mash in the form of an ammonium compound and supplying an alkaline neutralizing agent to the mash throughout the fermentation to control the acidity thereof, the said neutralizing agent being introduced in the form of an initial addition of calcium carbonate in a concentration of approximately 5% based on the weight of the sugar in the mash in excess of that required to neutralize the initial acidity of the mash.

JOHN C. WOODRUFF.
HUGH R. STILES.
DAVID A. LEGG.